---

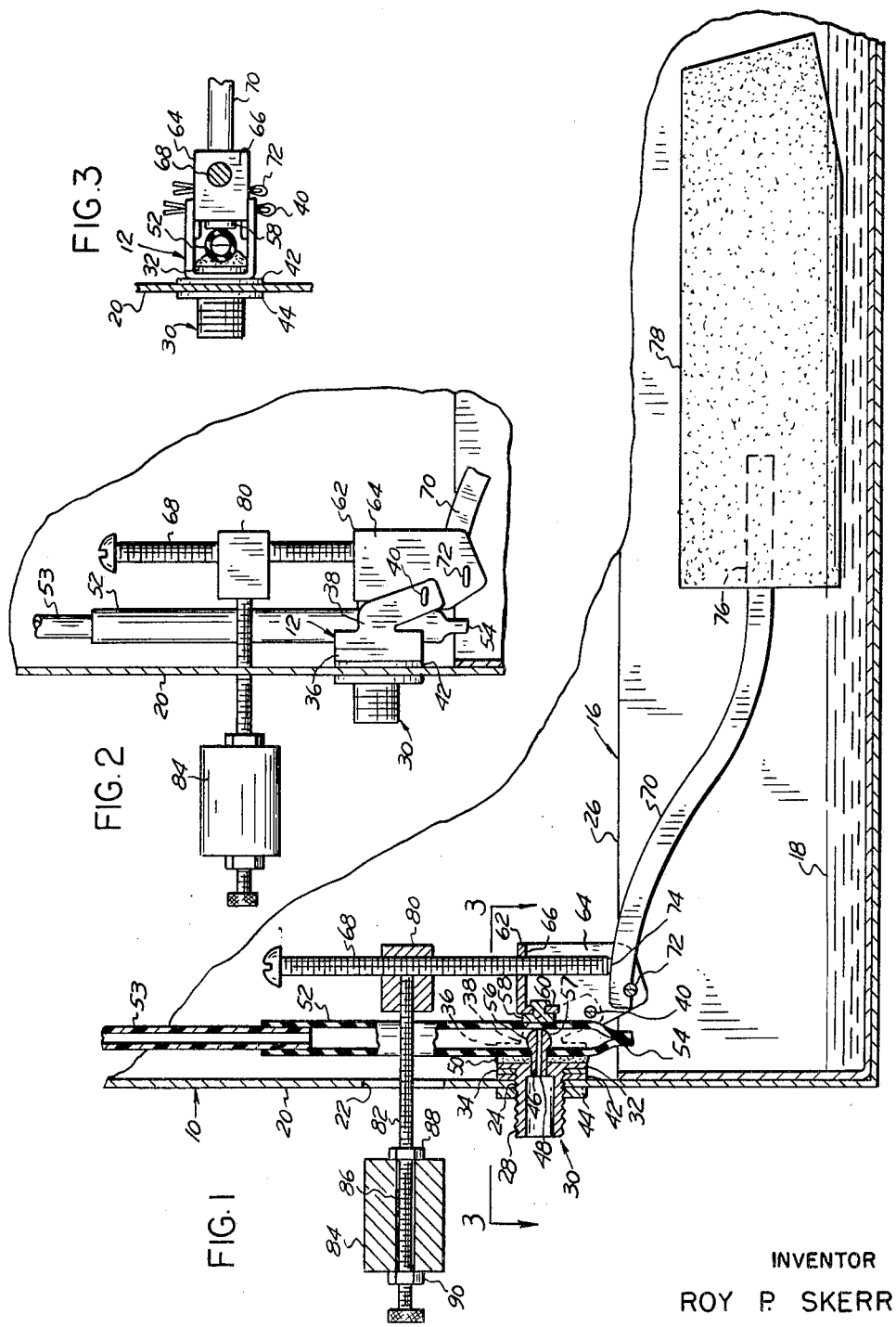
April 28, 1970 R. P. SKERRITT 3,508,574
EXTERNALLY-ADJUSTABLE HUMIDIFIER FLOAT VALVE
Filed May 2, 1968
INVENTOR
ROY P. SKERRITT
BY Barthel & Bugbee
ATTORNEYS

United States Patent Office 3,508,574
Patented Apr. 28, 1970

3,508,574
EXTERNALLY-ADJUSTABLE HUMIDIFIER FLOAT VALVE
Roy P. Skerritt, 18411 Inkster Road,
Livonia, Mich. 48152
Filed May 2, 1968, Ser. No. 726,087
Int. Cl. F16k *31/18;* F24f *3/14*
U.S. Cl. 137—451                               7 Claims

ABSTRACT OF THE DISCLOSURE

The range of motion of the arm of the float which controls the shutting off of the water supply to the humidifier pan is controlled and limited by an elongated vertical screw, the threaded shank of which carries a transversely-threaded nut into which an elongated transverse screw is threaded. This screw serves as a lock screw and also as a threaded lever arm for a counterweight which is slidable back and forth thereon and locked in its adjusted position by lock nuts threaded upon the transverse screw. External adjustment is easily obtained by moving the counterweight along the transverse screw, thereby giving greater sensitivity and enabling a shallower immersion for a smaller float than has been hitherto possible.

---

In the drawing:

FIGURE 1 is a side elevation, partly in section, of an externally-adjustable humidifier float valve, according to one form of the invention;

FIGURE 2 is a side elevation of the water supply valve shown in vertical section in FIGURE 1; and FIGURE 3 is a horizontal section taken along the line 3—3 in FIGURE 1.

Referring to the drawing in detail, there is shown therein a humidifier casing 10 equipped with an externally-adjustable float valve 12 operating in a water receptacle or pan 16 to maintain the water level 18 at a desired depth. The front wall 20 of the humidifier casing 10 is provided with a vertical slot 22 for the passage of the adjustment mechanism set forth below. The slot 22 and a hole 24 below it are both located in vertical alignment with one another and above the top edge 26 of the humidifier pan 16.

Extending outward through the hole 24 from within the humidifier casing 10 is the externally-threaded shank 28 of a stationary tubular valve member or nipple 30 which on its inner side is provided with a shouldered portion 32. Mounted on the threaded shank 28 adjacent the shouldered portion 32 is the rear wall 34 of a stationary bracket 36 having parallel side wings 38 extending downwardly in an inclined direction and drilled transversely in alignment to receive an upper pivot pin 40. The pivot pin 40 may conveniently consist of a conventional cotter pin. A washer 42 is interposed between the bracket wall 34 and the casing wall 20 to prevent leakage of water through the hole 24 while a lock nut 44 threaded upon the external portion of the threaded shank 28 holds the bracket 36 firmly against the inner surface of the casing wall 20.

Extending inward from the tubular shank 28 is a tubular valve stem or nozzle 46 having a water passageway 48 therethrough. The valve stem 46 passes through a gasket 50 of rubber or the like and through a hole 51 in the side wall of a resilient valve tube 52, also preferably of natural or synthetic rubber or synthetic plastic. The upper end of the valve tube 52 is connected to a flexible water discharge tube 53 of synthetic plastic or the like. The valve nipple 30 is connected to a source of water supply (not shown) under pressure. The lower end 54 of the valve tube 52 is closed, whereas the upper end of the tube 53 is positioned at a water discharge location in the humidifier.

The portion of the side wall of the tube 52 opposite the spherical valve head 56 in which the valve stem 46 terminates is held against the valve seat 57 at the inner end of the water passageway 48 in closing relationship therewith by a contact pad or movable valve member 58 of natural or synthetic rubber or synthetic plastic, the shank of which is seated in the suitably-drilled arm 60 of a movable float arm support 62, the downwardly-extending parallel side wings or ears 64 of which are drilled in alignment with the pivot pin 40 for the reception thereof so as to freely pivot thereon.

The bridge portion 66 at the top of the movable float arm support 62 interconnecting the downwardly-extending parallel side wings 64 is drilled and threaded for the passage of an elongated vertical float-adjusting screw or adjustment element 68, the lower end of which engages the upper side of a float arm 70. The side wings 64 of the movable float arm support 62 near their lower ends are drilled in alignment with one another to receive a lower pivot pin 72 upon which the rearward end of the float arm 70 is pivotally mounted. The lower pivot pin 72 may also conveniently consist of a conventional cotter pin. From FIGURE 1 it will be observed that the contact point 74 of the lower end of the adjusting screw 68 with the float arm 70 is spaced away from the lower pivot pin 72 to control the vertical limit of swing of the float arm 70 around its pivot 72. The forward end of the float arm 70 is seated as at 76 in one end of a float 78 which may be of any suitable float material, such as foam glass.

Threaded onto the shank of the elongated vertical float adjusting screw 68 is a vertically-drilled and threaded block nut 80 which is also horizontally drilled and threaded to receive the end of the elongated horizontal float adjusting screw or counterweight carrier 82. Slidably mounted upon the horizontal float-adjusting screw 82 is a counterweight 84 having a smooth bore 86 therethrough for the passage of the threaded shank 82. Lock nuts 88 and 90 threaded onto the horizontal float adjustment screw 82 at opposite ends of the counterweight 84 serve to hold the counterweight 84 in its adjusted position.

In the adjustment of the valve of the invention, let it be assumed that the above-described parts have been installed as shown in FIGURE 1, it being understood that the humidifier casing 10 has been bolted or otherwise attached to the hot air furnace in a conventional manner well understood by those skilled in the heating and ventilation art. The rough adjustment of the float 78 and consequently of the float valve 12 is made by the workman during the installation of the humidifier, namely by rotating the vertical screw 68 by means of a screw driver until the water supply is shut off in response to the rise of the float 78 to approximately the desired water level 18. The fine adjustment is made by loosening the lock nuts 88 and 90 and moving the counterweight 84 back and forth along the horizontal screw 82 until the exact water level 18 is obtained when the valve 12 closes.

In the operation of the valve 12, let it be assumed that a humidifier water pan 16 is empty. As a consequence, the float 78 and float arm 70 move downward around the lower pivot pin 72, consequently swinging the movable float arm support 62 downward in a clockwise direction around the upper pivot pin 40, thereby moving the contact pad 58 away from the valve head 56. As a result, the pressure of the water entering the nipple 30 from the source of water supply, such as an ordinary house water main, spurts through the water passageway 48 and pushes the side wall of the valve tube 52 away from the end thereof. As a result, the water flows upward through the water discharge tube 53 to the point of discharge in the humidifier, whence the residue not evaporated falls downward into the water pan 16. If the humidifier is of the type having porous evaporator plates or fabrics which dip into the water pan 16, the tube 53 is omitted and the valve tube 52 is inverted with its closed end 54 uppermost, so as to discharge directly into the pan 16.

As the depth of the water increases in the humidifier pan 16, it causes the float 78 to rise, swinging the float arm 70 and float arm support 62 counterclockwise around the upper pivot pin 40, pushing the contact pad 58 and the side wall of the valve tube 52 toward the end of the valve head 56. When the water level 18 has risen to the height for which the valve has been set, the contact pad 58 forces the side wall of the valve tube 52 tightly against the valve seat 57 around the end of the passageway 48 in the valve head 56, closing it and temporarily preventing further flow of water through it and consequently halting water flow upward through the water discharge tube 53.

In response to the operation of the furnace and the action of the heat therefrom evaporating the water in the humidifier pan 16, the water level 18 falls and with it the float 78. This action swings the float arm 70 and float arm support 62 downward in a clockwise direction around the upper pivot pin 40, again moving the contact pad 58 away from the valve seat 57 in the valve head 56 and reopening the inner end of the water passageway 48 in the valve head 56. The consequent flow of water again pushes the side wall of the tube 52 away from the inner end of the water passageway 48, again permitting water to flow upward through the tube 52. The unevaporated residue again falls into the humidifier pan 16 to again raise the water level 18 to a point where the float 78 will again rise and shut the valve 12 in the manner described above. This action goes on continuously as long as the furnace is in operation.

Should the householder desire to change the adjustment of the humidifier valve 12 in order to achieve a different condition of humidification, he himself can adjust the valve 12 without the need, hitherto required, of calling in a mechanic skilled in humidifier adjustment operation. This adjustment he can perform because of the external location of the counterweight 84, which he adjusts back and forth along the horizontal screw 82 until he achieves the desired condition of humidity, whereupon he tightens the lock inuts 88 and 90 to hold the adjustment which he has thus made. During the rise and fall of the float 78 and the consequent upward and downward swinging of the float arm support 62 around its upper pivot pin 40, the vertical screw 68 and the nut block 80 thereon consequently swing upward or downward around the upper pivot pin 40, whereupon the slot 22 in the front wall 20 of the humidifier casing 10 permits the consequent swinging of the horizontal adjustment screw 82 brought about by the swinging of the nut block 80 in which it is seated.

The construction of the float valve 12 and its precision of adjustment enable the float 78 and its associated parts to be made smaller and more compact than previous float valves requiring internal adjustments. This results in economizing on space and enables the remainder of the humidification mechanism to occupy a larger proportion of the available space within the humidifier casing 10. Moreover, adequate valve-closing force is exerted by the float 78 upon the contact pad 58 at a much shallower immersion of the float 78 in the water than with prior humidifier float valves. At the same time, the water passageway 48 can be maintained at a diameter adequate to prevent clogging. Thus, a lower level 18 of water can be maintained in the humidifier pan 16, with a consequent increase in the space available for the remainder of the humidifying mechanism.

I claim:

1. An externally-adjustable humidifier float valve for regulating the level of water in a water receptacle, comprising:

a stationary valve member having a water passageway therethrough adapted to be connected to a source of water under pressure and having a valve nozzle with a valve seat thereon, a bracket structure mounted adjacent said stationary valve member, a water discharge valve tube of resilient material connected to said stationary valve member and having an aperture in a wall on one side of said tube, said valve nozzle projecting through said aperture into engageability with the inner surface of the wall on the opposite side of said tube, a float arm support pivotally mounted on said bracket structure, said support carrying a movable valve member aligned with said valve seat with the wall of said tube disposed therebetween, a float arm connected to said support, a float on said float arm responsive to a rise of water level in the receptacle to move said movable valve member and urge said opposite side of said wall of said tube into closing engagement with said valve seat, a threaded adjustment element threaded through said bracket structure into engagement with said float arm, a counterweight carrier secured transversely to said adjustment element, and a counterweight movably mounted on said counterweight carrier for adjustment travel therealong.

2. An externally-adjustable humidifier float valve, according to claim 1, wherein said counterweight carrier includes a nut element threaded upon said threaded adjustment element and an approximately horizontal member secured to and projecting laterally from said nut element.

3. An externally-adjustable humidifier float valve, according to claim 2, wherein said counterweight is slidably mounted upon said approximately horizontal member.

4. An externally-adjustable humidifier float valve, according to claim 2, wherein said approximately horizontal member is threaded and is secured at one end to said nut element.

5. An externally-adjustable humidifier float valve, according to claim 4 wherein said counterweight is slidably mounted on said threaded approximately horizontal member, and wherein means is provided for locking said counterweight in its adjusted position on said approximately horizontal member.

6. An externally-adjustable humidifier float valve, according to claim 5, wherein said locking means includes a lock nut threaded upon said approximately horizontal member into locking engagement with said counterweight.

7. An externally-adjustable humidifier float valve, according to claim 5, wherein said counterweight has a smooth bore therethrough slidably engaging said approximately horizontal member, and wherein said locking means includes a pair of lock nuts threaded upon said approximately horizontal member at opposite ends of said counterweight.

References Cited
UNITED STATES PATENTS

| | | | |
|---|---|---|---|
| 2,831,497 | 4/1958 | Skerritt | 137—451 X |
| 2,839,279 | 6/1958 | Harris et al. | 137—451 X |
| 3,004,748 | 10/1961 | Sprouse et al. | 251—234 |

WILLIAM F. O'DEA, Primary Examiner

D. R. MATTHEWS, Assistant Examiner

U.S. Cl. X.R.

251—234; 126—113